(12) United States Patent
Brodie

(10) Patent No.: US 7,648,933 B2
(45) Date of Patent: Jan. 19, 2010

(54) COMPOSITION COMPRISING SPINEL CRYSTALS, GLASS, AND CALCIUM IRON SILICATE

(75) Inventor: Sally H. Brodie, Stuart, FL (US)

(73) Assignee: Dynamic Abrasives LLC, LaPorte, IN (US)

( * ) Notice: Subject to any disclaimer, the term of this patent is extended or adjusted under 35 U.S.C. 154(b) by 345 days.

(21) Appl. No.: 11/653,130

(22) Filed: Jan. 12, 2007

(65) Prior Publication Data

US 2007/0167307 A1 Jul. 19, 2007

Related U.S. Application Data

(60) Provisional application No. 60/758,677, filed on Jan. 13, 2006.

(51) Int. Cl.
| | |
|---|---|
| C04B 35/04 | (2006.01) |
| C04B 35/03 | (2006.01) |
| C04B 35/00 | (2006.01) |
| B32B 17/06 | (2006.01) |
| B32B 15/00 | (2006.01) |
| B24D 3/02 | (2006.01) |
| C09C 1/68 | (2006.01) |

(52) U.S. Cl. ............... 501/120; 501/110; 501/112; 501/127; 428/426; 428/432; 51/308; 51/309

(58) Field of Classification Search ............ 51/308, 51/309, 293; 501/120, 110, 112, 126, 127; 428/426, 432
See application file for complete search history.

(56) References Cited

U.S. PATENT DOCUMENTS

| | | | |
|---|---|---|---|
| 3,260,587 A | 7/1966 | Dolf | |
| 3,479,132 A | 11/1969 | Wickham | |
| 3,563,683 A | 2/1971 | Hess | |
| 3,616,041 A | 10/1971 | Kehr | |
| 3,619,131 A | 11/1971 | Grabmaier | |
| 3,628,937 A | 12/1971 | Schott | |
| 3,650,802 A | 3/1972 | Kehr | |

(Continued)

OTHER PUBLICATIONS

Gao et al. Thermal Analysis of Nucleation and Growth of Crystalline Phases in Vitrified Industrial Waste. J Am Ceram Soc, 82 (3), 561-565 (1999).*

(Continued)

*Primary Examiner*—Karl E Group
*Assistant Examiner*—Noah S Wiese
(74) *Attorney, Agent, or Firm*—Howard J. Greenwald

(57) ABSTRACT

A composition with a Mohs hardness of at least 6.0, wherein said composition contains at least 30 weight percent of spinel crystals, at least 10 weight percent of glass, and less than 10 weight percent of ferrometalsilicate. The composition also contains particles with a particle size distribution such that at least about 95 weight percent of such particles are smaller than about 2.0 millimeters; at least about 70 weight percent of such particles have a particle shape that is either the blocky particle shape or the pyramidal particle shape. At least 20 weight percent of the spinel crystals are equiaxed spinel crystals; the weight/weight ratio of said spinel crystals to said glass is at least 1.2/1; the composition has a melting point in excess of 1440 degrees Celsius; and the composition has a density of from about 3.0 to about 4.5.

30 Claims, 2 Drawing Sheets

U.S. PATENT DOCUMENTS

| | | |
|---|---|---|
| 3,657,780 A | 4/1972 | Stolte |
| 3,738,792 A | 6/1973 | Feng |
| 3,767,377 A | 10/1973 | Poulos |
| 3,785,842 A | 1/1974 | Murray |
| 3,811,851 A | 5/1974 | MacKenzie |
| 3,853,491 A | 12/1974 | Dunham |
| 3,856,213 A | 12/1974 | Dulaney |
| 3,884,835 A | 5/1975 | Vaughan |
| 3,940,276 A | 2/1976 | Wilson |
| 3,951,632 A | 4/1976 | Seki |
| 3,975,174 A | 8/1976 | Camerlinck |
| 4,024,309 A | 5/1977 | Pender |
| 4,038,063 A | 7/1977 | Williams |
| 4,061,724 A | 12/1977 | Grose |
| 4,124,365 A | 11/1978 | Williams |
| 4,194,887 A | 3/1980 | Ueltz |
| 4,196,070 A | 4/1980 | Chao |
| 4,203,761 A | 5/1980 | Rose |
| 4,205,392 A | 5/1980 | Byrum, Jr. |
| 4,283,306 A | 8/1981 | Herkes |
| 4,315,538 A | 2/1982 | Nielsen |
| 4,317,683 A | 3/1982 | Eppler |
| 4,325,929 A | 4/1982 | Young |
| 4,363,646 A | 12/1982 | Torobin |
| 4,380,552 A | 4/1983 | Gestrelius |
| 4,401,638 A | 8/1983 | Caballero |
| 4,403,060 A | 9/1983 | Netherton |
| 4,410,996 A | 10/1983 | Svensson |
| 4,430,107 A | 2/1984 | Dennert |
| 4,430,108 A | 2/1984 | Hojaji |
| 4,463,043 A | 7/1984 | Reeves |
| 4,518,703 A | 5/1985 | Young |
| 4,519,811 A | 5/1985 | Lalancette |
| 4,537,867 A | 8/1985 | Fiato |
| 4,541,842 A | 9/1985 | Rostoker |
| 4,549,893 A | 10/1985 | Hindman |
| 4,557,090 A | 12/1985 | Keller, Sr. |
| 4,575,493 A | 3/1986 | Rauch, Sr. |
| 4,604,140 A | 8/1986 | Lalancette |
| 4,617,043 A | 10/1986 | Reunamaki |
| 4,696,690 A | 9/1987 | Roloff |
| 4,703,019 A | 10/1987 | Abe |
| 4,723,979 A | 2/1988 | Fitzke |
| 4,781,742 A | 11/1988 | Hill |
| 4,793,845 A | 12/1988 | Fitzke |
| 4,797,092 A | 1/1989 | Pieper |
| 4,798,758 A | 1/1989 | Nagano |
| 4,833,015 A | 5/1989 | Furuuchi |
| 4,848,041 A | 7/1989 | Kruschke |
| 4,861,657 A | 8/1989 | Nishino |
| 4,875,919 A | 10/1989 | DeSaro |
| 4,877,449 A | 10/1989 | Khinkis |
| 4,934,307 A | 6/1990 | Sumiyoshi |
| 4,975,324 A | 12/1990 | Torii |
| 4,975,391 A | 12/1990 | Shimizu |
| 4,985,375 A | 1/1991 | Tanaka |
| 5,007,943 A | 4/1991 | Kelly |
| 5,009,676 A | 4/1991 | Rue |
| 5,028,567 A | 7/1991 | Gotoh |
| 5,028,569 A | 7/1991 | Cihon |
| 5,030,609 A | 7/1991 | Turner |
| 5,035,723 A | 7/1991 | Kalinowski |
| 5,066,619 A | 11/1991 | Kasuga |
| 5,069,960 A | 12/1991 | Fukumoto |
| 5,103,598 A | 4/1992 | Kelly |
| 5,104,424 A | 4/1992 | Hickory |
| 5,125,943 A | 6/1992 | Cole |
| 5,128,284 A | 7/1992 | Olson |
| 5,129,919 A | 7/1992 | Kalinowski |
| 5,161,696 A | 11/1992 | Seider |
| 5,185,012 A | 2/1993 | Kelly |
| 5,206,068 A | 4/1993 | Kalkanoglu |
| 5,219,018 A | 6/1993 | Meyer |
| 5,221,652 A | 6/1993 | Tierney |
| 5,244,477 A | 9/1993 | Rue |
| 5,254,162 A | 10/1993 | Speer |
| 5,256,202 A | 10/1993 | Hanamura |
| 5,273,566 A | 12/1993 | Balcar |
| 5,278,111 A | 1/1994 | Frame |
| 5,302,341 A | 4/1994 | Palowitz |
| 5,313,097 A | 5/1994 | Haj-Ali-Ahmadi |
| 5,326,526 A | 7/1994 | Ikenoue |
| 5,334,364 A | 8/1994 | Aguirre-Villafana |
| 5,336,297 A | 8/1994 | McElroy |
| 5,336,421 A | 8/1994 | Kurita |
| 5,338,336 A | 8/1994 | Greenwalt |
| 5,342,427 A | 8/1994 | Alexander |
| 5,350,118 A | 9/1994 | Mitchell |
| 5,350,778 A | 9/1994 | Steppan |
| 5,364,447 A | 11/1994 | Philipp |
| 5,372,620 A | 12/1994 | Rowse |
| 5,372,630 A | 12/1994 | Foo |
| 5,382,449 A | 1/1995 | Hedges |
| 5,383,945 A | 1/1995 | Cottringer |
| 5,395,407 A | 3/1995 | Cottringer |
| 5,399,181 A | 3/1995 | Sorg |
| 5,403,991 A | 4/1995 | Tylko |
| 5,411,352 A | 5/1995 | Eren |
| 5,426,145 A | 6/1995 | Ponce |
| 5,431,704 A | 7/1995 | Tamamaki |
| 5,431,705 A | 7/1995 | Wood |
| 5,443,614 A | 8/1995 | Li |
| 5,443,788 A | 8/1995 | Palowitz |
| 5,460,638 A | 10/1995 | Lock |
| 5,462,570 A | 10/1995 | Balcar |
| 5,464,114 A | 11/1995 | Green |
| 5,468,432 A | 11/1995 | Hurley |
| 5,470,375 A | 11/1995 | Greenwalt |
| 5,472,500 A | 12/1995 | Janicki |
| 5,476,416 A | 12/1995 | Kodate |
| 5,492,548 A | 2/1996 | Wasikowski |
| 5,498,275 A | 3/1996 | Reunamaki |
| 5,498,285 A | 3/1996 | Hooykaas |
| 5,507,852 A | 4/1996 | Frank |
| 5,514,631 A | 5/1996 | Cottringer |
| 5,515,920 A | 5/1996 | Luk |
| 5,516,573 A | 5/1996 | George |
| 5,524,837 A | 6/1996 | Raynes |
| 5,529,594 A | 6/1996 | Wetmore |
| 5,531,274 A | 7/1996 | Blenvenu, Jr. |
| 5,538,532 A | 7/1996 | Keegel, Jr. |
| 5,538,786 A | 7/1996 | Hurley |
| 5,551,632 A | 9/1996 | Kish |
| 5,552,221 A | 9/1996 | So |
| 5,553,532 A | 9/1996 | de la Luz-Martinez |
| 5,556,443 A | 9/1996 | Alexander |
| 5,556,444 A | 9/1996 | Reunamaki |
| 5,557,031 A | 9/1996 | Al-Sugair |
| 5,558,161 A | 9/1996 | Vitthal |
| 5,558,690 A | 9/1996 | Hnat |
| 5,558,691 A | 9/1996 | Horn |
| 5,562,160 A | 10/1996 | Brannon |
| 5,563,232 A | 10/1996 | Hurley |
| 5,569,152 A | 10/1996 | Smith |
| 5,575,335 A | 11/1996 | King |
| 5,578,102 A | 11/1996 | Alexander |
| 5,582,250 A | 12/1996 | Constien |
| 5,585,452 A | 12/1996 | Hurley |
| 5,588,978 A | 12/1996 | Argent |
| 5,589,118 A | 12/1996 | Ford, Jr. |
| 5,595,245 A | 1/1997 | Scott, III |
| 5,597,043 A | 1/1997 | Stadulis |
| 5,599,378 A | 2/1997 | Mishima |
| 5,601,631 A | 2/1997 | Rinker |

| | | |
|---|---|---|
| 5,604,194 A | 2/1997 | Cauwberghs |
| 5,605,640 A | 2/1997 | Tylko |
| 5,611,870 A | 3/1997 | Home |
| 5,613,453 A | 3/1997 | Donovan |
| 5,620,049 A | 4/1997 | Gipson |
| 5,620,491 A | 4/1997 | Puhl |
| 5,626,249 A | 5/1997 | Tylko |
| 5,654,976 A | 8/1997 | Cowx |
| 5,667,553 A | 9/1997 | Keegel, Jr. |
| 5,690,707 A | 11/1997 | Wood |
| 5,695,642 A | 12/1997 | Greenleigh |
| 5,698,759 A | 12/1997 | Fray |
| 5,702,502 A | 12/1997 | Kundrat |
| 5,714,113 A | 2/1998 | Gitman |
| 5,731,367 A | 3/1998 | Lee |
| 5,738,684 A | 4/1998 | Thomas |
| 5,738,694 A | 4/1998 | Ford, Jr. |
| 5,744,239 A | 4/1998 | Buccellato |
| 5,754,002 A | 5/1998 | Haitko |
| 5,762,891 A | 6/1998 | Downey |
| 5,766,303 A | 6/1998 | Bitler |
| 5,769,918 A | 6/1998 | Burt |
| 5,769,961 A | 6/1998 | Peters |
| 5,770,145 A | 6/1998 | Gerk |
| 5,964,911 A | 10/1999 | Morano |
| 5,981,413 A * | 11/1999 | Hale .......................... 501/32 |
| 5,990,398 A | 11/1999 | Nonaka |
| 6,018,969 A | 2/2000 | Haseley |
| 6,057,257 A * | 5/2000 | Morano et al. ................ 501/53 |
| 6,702,571 B2 | 3/2004 | Abbasi |
| 6,706,083 B1 * | 3/2004 | Rosenflanz ................. 51/309 |
| 6,716,292 B2 | 4/2004 | Nielsen, Jr. |
| 6,776,838 B2 | 8/2004 | Hemmings |
| 6,793,742 B2 | 9/2004 | Sakaki |
| 2005/0236747 A1 | 10/2005 | Rue |

OTHER PUBLICATIONS

Kingery et al., Introduction to Ceramics, 1976, pp. 64-66, Second Edition, John Wiley and Sons, New York.

Brady et al., Materials Handbookj, 1991, pp. 376-382, Thirteenth Edition, McGraw Hill, Inc., New York.

* cited by examiner

COMPOSITION COMPRISING SPINEL CRYSTALS, GLASS, AND CALCIUM IRON SILICATE

CROSS-REFERENCE TO RELATED PATENT APPLICATION

This patent application claims priority based upon provisional patent application 60/758,677, filed on Jan. 13, 2006.

BACKGROUND OF THE INVENTION

Several years ago two patents were issued on an abrasive material made from electric arc furnace dust. These patents were U.S. Pat. Nos. 5,964,911 and 6,057,257 (filed in the names of Gerald P. Balcar and James Morano); the entire disclosure of each of these patents is hereby incorporated by reference into this specification. In the remainder of this specification, these patents will be referred to as the "Balcar patents."

The Balcar patents described a composition that contained at least 60 weight percent of ferrometasilicate. Thus, e.g., at lines 18-29 of column 3 of U.S. Pat. No. 6,057,257, it is disclosed that "The abrasive composition of this invention is comprised of at least about 60 weight percent of ferrometasilicate, which has the formula $FeSiO_3$. This iron compound is well known in the art and is described, e.g., in U.S. Pat. Nos. 5,326,526, 4,604,140, 4,519,811, 4,205,392, 3,650,802, 3,616,041, and the like."

U.S. Pat. No. 5,981,413 of Roland D. Hale issued at about the same time as the Balcar patents, and it also related to the same abrasive composition. The Hale patent, however, did not specify the amount of ferrometasilicate that was present in its claimed composition.

During the latter part of the 1990's, Estech of Hollywood, Fla. sold a composition made in accordance with the teachings of the Balcar patents and the Hale patent under the name of "Vetroblast." In a sales brochure dated Jan. 3, 2002, entitled "Vetroblast Fast Acting Blasting Abrasive," it is disclosed that such abrasive was " . . . a unique glass-ceramic . . . "whose" . . . base material is composed of ferrosilicate crystals with randomly dispersed spinels in a vitreous matrix." In the "Components Information" section of this brochure, it is disclosed that "Vetroblast" is comprised of 35 weight percent of silicon dioxide ($SiO_2$) and 35 weight percent of iron oxide ("$Fe_2O_3/Fe_3O_4$").

The "Vetroblast" material is substantially inferior to the material made by the process of the instant invention. Thus, e.g., the "Vetroblast" material is not sufficiently durable, being unsuitable for many repeated uses as a blasting abrasive; applicants' composition, by comparison, can be repeatedly used as blasting abrasive without losing effectiveness. Thus, e.g., applicant's composition may be used a closed circuit blasting abrasive as well as an open blasting abrasive product. In addition, the composition of the instant invention contains a relatively high percentage of blocky shaped particles down to small particle sizes (63 microns or less).

Without wishing to be bound to any particular theory, applicant believes that the presence of a substantial amount of ferrometasilicate in the prior art "Vetroblast" loose grain blasting abrasive material adversely affected the properties of such abrasive. It is not believed that such "Vetroblast" was a commercial success; it is not being sold today.

It is an object of this invention to provide a novel abrasive composition that is substantially superior to the "Vetroblast" abrasive composition.

SUMMARY OF THE INVENTION

In accordance with this invention, there is provided a composition with a Mohs hardness of at least 6.0, wherein said composition is comprised of at least 30 weight percent of spinel crystals, at least 10 weight percent of glass, and less than 10 weight percent of ferrometalsilicate. The composition is comprised of particles with a particle size distribution such that at least about 95 weight percent of such particles are smaller than about 2.0 millimeters, wherein at least about 70 weight percent of such particles have a particle shape that is selected from the group consisting of blocky particle shape, pyramidal particle shape, and mixtures thereof. At least 20 weight percent of said spinel crystals are equiaxed spinel crystals; the weight/weight ratio of said spinel crystals to said glass is at least 1.2/1; the composition has a melting point in excess of 1300 degrees Celsius; and the composition has a density of from about 3.0 to about 4.5.

BRIEF DESCRIPTION OF THE DRAWINGS

The invention will be described by reference to the specification, to the claims, and to the drawings, in which like numerals refer to like elements, and wherein:

DESCRIPTION OF THE PREFERRED EMBODIMENTS

Figure 1:
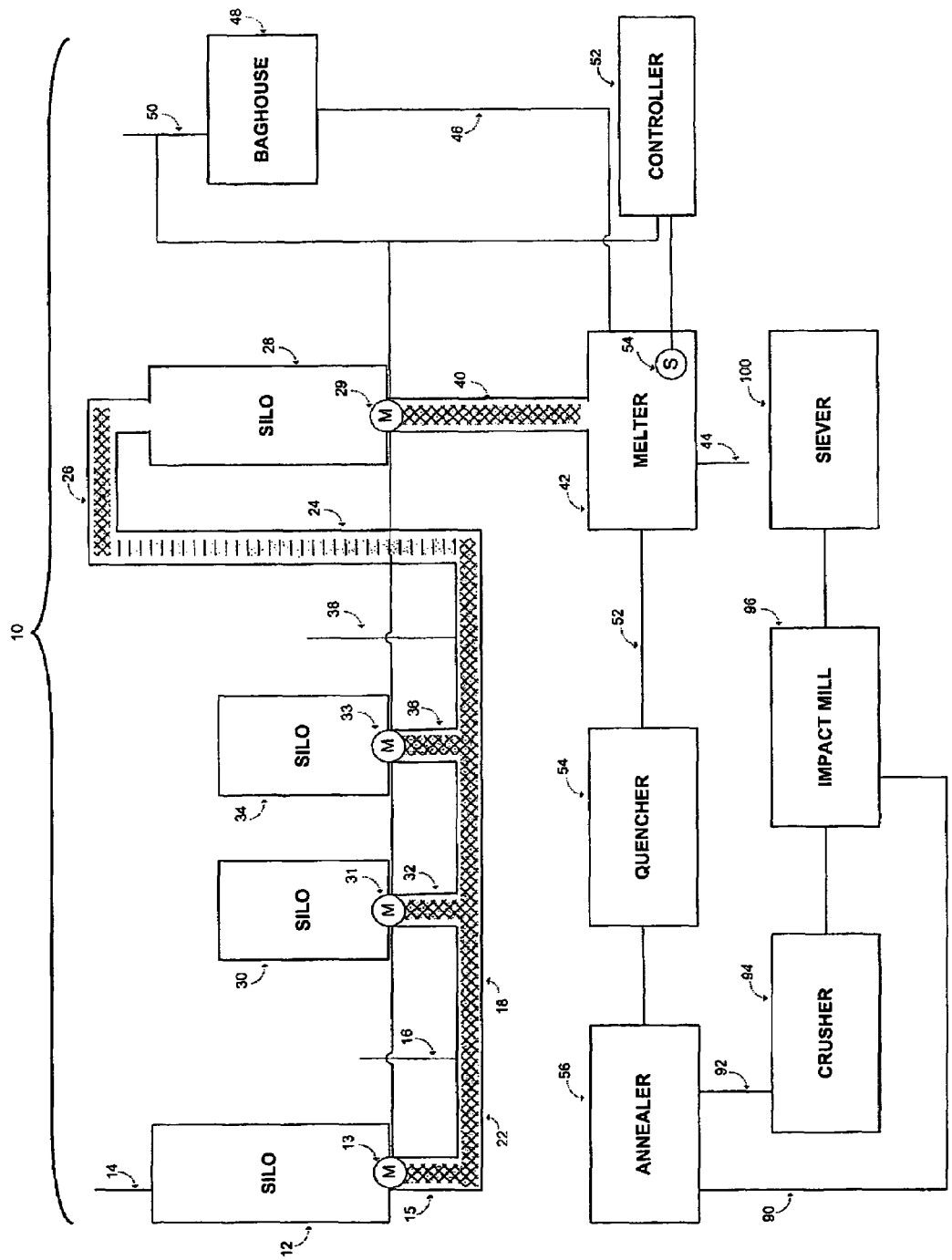
FIG. 1 is a schematic of one preferred process of the invention.

The composition of this invention is preferably a particulate composition that is preferably comprised of at least 95 weight percent of particles smaller than about 2.0 millimeters. As is described elsewhere in this specification, such composition is preferably made by preparing a glass-ceramic composition from, e.g., electric arc furnace dust and silica, quenching such composition, and then comminuting and classifying such composition to make one or more different particle consists.

In one embodiment, after classification the composition has a particle size distribution such that at least 95 weight percent of its particles are smaller than about 2.0 millimeters and, more preferably, about 1.8 millimeters. In one aspect of this embodiment, at least about 95 weight percent of such particles have a size in the range of from about 1.0 to about 1.8 millimeters.

In one embodiment, after classification the composition has a particle size distribution such that at least 95 weight percent of its particles are smaller than about 1.4 millimeters and, more preferably, about 1.2 millimeters. In one aspect of this embodiment, at least about 95 weight percent of such particles have a size in the range of from about 0.7 to about 1.4 millimeters.

In one embodiment, after classification the composition has a particle size distribution such that at least 95 weight percent of its particles are smaller than about 1000 microns and, more preferably, about 850 microns. In one aspect of this embodiment, at least about 95 weight percent of such particles have a size in the range of from about 425 to about 850 microns.

In one embodiment, after classification the composition has a particle size distribution such that at least 95 weight percent of its particles are smaller than about 700 microns. In one aspect of this embodiment, at least about 95 weight percent of such particles have a size in the range of from about 250 to 600 microns.

In one embodiment, after classification the composition has a particle size distribution such that at least 95 weight percent of its particles are smaller than about 400 microns. In one aspect of this embodiment, at least about 95 weight percent of such particles have a size in the range of from about 150 to about 350 microns.

In one embodiment, after classification the composition has a particle size distribution such that at least 95 weight percent of its particles are smaller than about 200 microns. In one aspect of this embodiment, at least about 95 weight percent of such particles have a size in the range of from about 90 to about 180 microns.

In one embodiment, after classification the composition has a particle size distribution such that at least 95 weight percent of its particles are smaller than about 180 microns. In one aspect of this embodiment, at least about 60 weight percent of such particles have a size in the range of from about 50 to about 180 microns.

In one embodiment, after classification the composition has a particle size distribution such that at least 95 weight percent of its particles are in the range of from about 425 to 2000 microns. In another embodiment, the composition has a particle size distribution such that at least 95 weight percent of its particles are in the range of from about 210 to 1,200 microns. In another embodiment, the composition has a particle size distribution such that at least 95 weight percent of its particles are in the range of from about 150 to 850 microns.

Applicant's novel composition is comprised of a substantially greater amount of spinel material (such as, e.g., spinel crystals) than are the prior art abrasive compositions. One such composition is described in U.S. Pat. No. 5,964,911, the entire disclosure of which is hereby incorporated by reference into this specification. As is disclosed in such patent, "In one embodiment, the abrasive composition is also comprised of at least five weight percent of one or more spinels. As is known to those skilled in the art, a normal spinel is a material with the formula $AR_2O_4$, wherein A is a divalent metal ion and R is a trivalent metal ion. A is usually a divalent metal or mixture of divalent metals such as magnesium, ferrous ion, zinc, calcium, cadmium, cobalt, copper, nickel, strontium, barium, nickel, and manganese, and R is usually selected from the group consisting of ferric ion, aluminum, and chromium. Typical spinels exist when A is zinc and R is iron, when A is magnesium and R is aluminum, when A is iron and R is aluminum, when A is cobalt and R is aluminum, when A is nickel and R is aluminum, when A is manganese and R is aluminum, and when A is zinc and R is aluminum. See, e.g., pages 64-66 of W. D. Kingery et al.'s "Introduction to Ceramics," Second Edition (John Wiley & Sons, New York, 1976)."

U.S. Pat. No. 5,964,911 also discloses that: "Alternatively, instead of the normal spinels described above, one may have one or more inverse spinels in which the divalent A ions and half of the trivalent R ions are on octahedral sites; and the other half of the R ions are on tetrahedral sites. The formula for these inverse spinels is $R(AR)O_4$. Some typical reverse spinels exist when R is iron and A is magnesium, when R is iron and A is Ti,Fe, when the spinel is ferric oxide, and the like. See, e.g., page 66 of the Kingery et al. reference."

U.S. Pat. No. 5,964,911 also discloses that: "Spinel structures are often found in abrasive compositions. See, e.g., U.S. Pat. Nos. 5,770,145, 5,690,707, 5,514,631, 5,431,705, 5,431,704, 5,395,407, and the like. The disclosure of each of these United States patents is hereby incorporated by reference into this specification."

U.S. Pat. No. 5,964,911 also discloses that: "In one embodiment, the abrasive composition of this invention contains from about 7 to about 25 weight percent of one or more spinels."

Many other patents make reference to spinel crystals. Thus, by way of illustration and not limitation, spinel crystals are referred to in the claims of U.S. Pat. No. 3,619,131 (Mg/Al spinel crystals), U.S. Pat. No. 3,785,842 (synthetic aggregates), U.S. Pat. Nos. 3,940,276, 5,383,945 (abrasive material and method), and the like. The entire disclosure of each of these United States patents is hereby incorporated by reference into this specification.

It appears that no more than about 25 weight percent of spinel material is used in the product described in U.S. Pat. No. 5,964,911. By comparison, applicant's composition is comprised of at least 30 weight percent of spinel crystals and, more preferably, at least about 35 weight percent of such spinel material. In one embodiment, applicant's composition comprises at least 40 weight percent of such spinel crystals. In one embodiment, applicant's composition is comprised of from about 50 to about 80 weight percent of such spinel crystals and from about 20 to about 60 weight percent of glass. It is preferred that the weight/weight ratio of said spinel crystals to said glass is at least 1.2/1 and, more preferably, 1.3/1. In one embodiment, the weight/weight ratio of said spinel crystals/glass is at least about 1.4/1 and, even more preferably, at least about 1.5/1.

In one preferred embodiment, at least about 20 weight percent of the spinel crystals are equiaxed spinel crystals; in one aspect of this embodiment, at least about 40 weight percent of said spinel crystals are equiaxed spinel crystals. As is known to those skilled in the art, an equiaxed grain is a polygonal crystallite, in an aggregate, whose dimensions are approximately the same in all directions. Reference may be had, e.g., to U.S. Pat. Nos. 3,853,491, 4,315,538, 5,009,676, 5,185,012, 5,256,202, 5,383,945, 6,716,292, 6,793,742, and 6,018,969. The entire disclosure of each of these United States patents is hereby incorporated by reference into this specification.

In one embodiment, the equiaxed spinel crystals have a maximum dimension of from about 10 to about 70 microns and, more preferably, from about 10 to about 50 microns. In one aspect of this embodiment, at least about 30 weight percent of the spinel crystals are equiaxed spinel crystals.

In one embodiment, in addition to having equiaxed spinel crystals in the composition, applicant's composition also is comprised of dendritic spinel crystals. As is known to those skilled in the art, dendrites are crystals, usually formed during solidification or sublimation, that are characterized by a tree-like pattern composed of many branches. Reference may be had, e.g., to U.S. Pat. No. 4,194,887 (fused alumina-zirconia abrasive material formed by an immersion process), U.S. Pat. Nos. 4,196,070, 4,975,391 (enamel frit composition), U.S. Pat. Nos. 5,219,018, 5,313,097, 5,611,870, and the like. The entire disclosure of each of these United States patents is hereby incorporated by reference into this specification. In another embodiment, none of the spinel crystals are equiaxed spinel crystals, but at least some of the spinel crystals are dendritic spinel crystals. When dendritic spinel crystals are present, it is preferred that at least about 20 weight percent of the spinel crystals are dendritic spinel crystals.

In one embodiment, both equiaxed spinel crystals and dendritic spinel crystals are present in the composition of this invention, and the weight/weight ratio of the dendritic spinel crystals/equiaxed spinel crystals ranges from about 1/1 to about 3/1 and, more preferably, from about 1/1 to about 2/1.

In one embodiment, the spinel crystals are comprised of from about 20 to about 80 weight percent of dendritic crystals and from about 80 to about 20 weight percent of equiaxed crystals, with the weight/weight ratio of the two being from about 0.33/1.0 to about 3.0/1.0. In one embodiment, such weight/weight ratio is form about 0.4/1 to about 2.5/1. In one aspect of this embodiment, at least about 1.5 times as much dendritic crystalline material is present as is the equiaxed material. In another aspect of this embodiment, at least 20 percent of the dendritic and spinel crystals are dendritic spinel crystals.

In one embodiment, the spinel crystals are comprised of relatively large, 100-500 micron, chromite crystals, preferably in a concentration of from about 0.1 to about 10 weight percent, by total weight of the spinel crystals. As is known to those skilled in the art, chromite is $FeCr_2O_4$. Chromite is discussed in the specifications and claims of, e.g., U.S. Pat. No. 5,030,609 (copper chromite), U.S. Pat. No. 5,128,284 (lanthanum chromite), U.S. Pat. Nos. 5,221,652, 5,254,162 (brown spinel pigments based on zinc chromites), U.S. Pat. No. 5,654,976 (method for melting ferrous scrap metal and chromite in a submerged arc furnace), U.S. Pat. No. 5,702,502 (method for the direct use of chromite ore in the production of stainless steel), and the like. The entire disclosure of each of these United States patents is hereby incorporated by reference into this specification.

In one embodiment, the spinel crystals are comprised of iron. Iron-containing spinels are well known to those skilled in the art and described, e.g., in U.S. Pat. No. 3,479,132 (transparent magnetic spinel crystal of mixed oxide of lithium, iron, and vanadium), U.S. Pat. No. 4,317,683 (orange pigments of inverse spinel structure produced by co-calcination of compounds of iron and zinc with compounds of titanium, tin, and/or silicon), U.S. Pat. No. 4,403,060 (transparent iron oxide spinels), U.S. Pat. No. 4,537,867 (iron-cobalt spinel), U.S. Pat. No. 4,975,324 (spinel type iron oxide compound), U.S. Pat. No. 5,336,421 (spinel-type spherical black iron oxide particles), and the like. The entire disclosure of each of these United States patents is hereby incorporated by reference into this specification. In one embodiment, at least 50 weight percent of the composition of this invention comprises iron-containing spinel crystals.

In one embodiment, the composition of this invention is comprised of from about 10 to about 35 percent or more of iron. In one aspect of this embodiment, at least about 50 weight percent of such iron is in the form of said spinel crystals, and more preferably at least about 60 weight percent of such iron is in the form of a spinel crystals. In one aspect of this embodiment, the composition of this invention is comprised of from about 20 to about 40 percent of an iron compound selected from the group consisting of ferrous oxide, ferric oxide, iron-containing spinels, and mixtures thereof.

In one embodiment, the composition of this invention is comprised from about 1 to about 20 weight percent of a calcium iron silicate that preferably has either the formula $Ca_2FeSi_2O_7$ or $[Ca,Fe]SiO_3$, or mixtures thereof. In one aspect of this embodiment, this calcium iron silicate is present in the composition as an anisotropic phase.

Calcium iron silicates are well known to those skilled in the art. Reference may be had to iron-substituted parawollastonite, to iron-akermanite, and the like.

The calcium iron silicate is preferably present in a crystalline form with a crystal size ranging from about 1 to about 15 microns, and more preferably, from about 5 to 10 microns.

In one embodiment, the composition of this invention, in addition to being comprised of a crystalline phase comprised of spinel crystals, is also comprised of at least one glass phase.

It is preferred that such composition contains at least about 10 weight percent of glass and, more preferably, at least about 25 weight percent of glass. In one aspect of this embodiment, the composition contains at least about 30 weight percent of glass.

In one embodiment, the composition contains more of such spinel crystals than of such glass. The weight/weight ratio of such spinel to such glass in the composition is preferably at least 1.2/1.0, and more preferably, at least about 1.4/1.0.

The glass present in the composition, in one embodiment, is an amorphous solid made by fusing silica with a basic oxide. Thus, e.g., such glass may be, e.g., a soda-lime glass, a lead glass, a lead-alkali glass, a borosilicate glass, an aluminosilcate glass, a phosphate glass, a sodium-aluminosilicate glass, a fused silica glass, etc.

In another embodiment, the glass used is a boric oxide glass such as, e.g., a borate glass with lanthanum and tantalum oxides.

In another embodiment, the glass used is an oxycarbide glass in which carbon is substituted for nitrogen.

In one embodiment (and unlike the "Vetroblast" prior art abrasive composition that contains at least 60 weight percent of ferrometasilicate), the abrasive composition of this invention is comprised of less than 10 weight percent of ferrometasilicate and, more preferably, less than about 5 weight percent of ferrometasilicate. In one aspect of this embodiment, such composition comprises less than about 1 weight percent of ferrometasilicate.

As is known to those skilled in the art, ferrometasilicate is an iron (plus 2 valence) salt of metasilicic acid ($H_2SiO_3$). Reference may be had, e.g., to page 698 of Paul W. Thrush's "A Dictionary of Mining, Mineral, and Related Terms" (United States Department of the Interior, Bureau of Mines, 1968).

In one embodiment, the composition of this invention contains less than about 0.2 weight percent of crystalline silica. As is known to those skilled in the art, crystalline silica is silicon dioxide that occurs in the crystalline forms as, e.g., quartz, cristobalite, and tridymite. Reference may be had, e.g., to U.S. Pat. No. 3,884,835 (crystalline silica compositions), U.S. Pat. No. 4,061,724 (crystalline silica), U.S. Pat. No. 4,283,306 (crystalline silica and use in alkylation), U.S. Pat. No. 4,325,929 (method of preparing crystalline silica polymorph), U.S. Pat. No. 4,518,703 (crystalline silica catalysts), and the like. The entire disclosure of each of these United States patents is hereby incorporated by reference into this specification.

In one embodiment, the composition of this invention contains less than 0.1 weight percent of crystalline silica.

In one embodiment, at least about 70 weight percent (and, more preferably, at least about 80 weight percent) of the particles in applicant's composition have a blocky or pyramidal particle shape. This particle shape is well known and is described, e.g., in the website of the Unified Abrasives Manufacturer's Association (www.UAMA.org). As is disclosed on such web site, the blocky shaped particles have an aspect ratio of from about 1:1 to about 1.5:1. Reference may also be had, e.g., to U.S. Pat. No. 5,161,696 (method for separating shapes of abrasive grains), U.S. Pat. No. 5,273,566 (process for producing an environmentally acceptable abrasive product from hazardous wastes), U.S. Pat. No. 6,776,838 (white pozzolan composition), and the like. The entire disclosure of each of these United States patents is hereby incorporated by reference into this specification.

Blocky and pyramidal grain shapes are also discussed in U.S. Pat. No. 5,964,911, the entire disclosure of which is hereby incorporated by reference into this specification. As is disclosed in such patent, "In one embodiment, the abrasive composition of this invention is preferably comprised of abrasive grains wherein at least about 60 weight percent of which have either the blocky and/or pyramidal (triangular) grain shape. In one preferred embodiment, at least about 70 weight percent of the abrasive particles are of the blocky and/or pyramidal shape. In one embodiment, an abrasive material which about 70 percent angular and 30 percent blocky became more angular in use."

U.S. Pat. No. 5,964,911 also discloses that: "These grain shapes are well known to those skilled in the art and are described, e.g., in U.S. Pat. Nos. 5,462,570, 5,372,620, 5,244,477, 5,185,012, 5,161,696, 5,129,919, 5,104,424, 5,103,598, 5,035,723, 5,009,676, 5,007,943, 4,848,041, and the like. The disclosure of each of these United States patents is hereby incorporated by reference into this specification."

In one embodiment, at least 80 percent of the particles in applicant's composition are comprised of blocky and/or pyramidal particles. In determining the concentration of blocky and/or pyramidal particles, one preferably counts the number of such blocky and/or pyramidal particles and divides by the total number of particles.

As indicated elsewhere in this specification, applicant's composition is preferably comprised of at least about 30 weight percent of spinel crystals that, preferably, are mixed metal solution spinel crystals. These mixed metal solution spinel crystals have a relatively high melting temperature, at least some of them melting at temperatures above about 1350 degrees Celsius In one experiment, the composition of this invention was heated to a temperature of 1,440 degrees Celsius. At this temperature, some crystalline structure remained in the composition indicating that at least some of the spinel crystals had melting points in excess of 1,440 degrees Celsius. Thus, it is safe to say that the composition of this invention has a melting point in excess of 1300 degrees Celsius.

In one embodiment, the composition of this invention has a melting point greater than about 1,440 degrees Celsius. As used in this specification, the term melting point refers to the temperature at which the last crystal in the composition disappears into the melt and the composition is entirely in a molten state.

In one embodiment, the composition of this invention has a Mohs hardness of from 6 to about 9. In one aspect of this embodiment, the composition of this invention has a Mohs hardness of from about 6 to about 8.

A Preferred Process for Making the Composition of this Invention

In one preferred embodiment of this invention, a mixture comprised of electric arc furnace dust is melted in a vertical shaft melting furnace such as, e.g., the vertical shaft melting furnace described in U.S. Pat. No. 4,877,449, the entire disclosure of which is hereby incorporated by reference into this specification. Claim 1 of such patent describes one of the preferred "vertical shaft furnace melting processes," and it describes "1. A process for melting solids comprising: charging meltable solids to an upper region of a bed of said solids supported in a vertical shaft melting furnace by a support means consisting of a fluid cooled support grid having openings smaller than an average diameter of said meltable solids; maintaining a melt pool at a bottom of said vertical shaft melting furnace; maintaining submerged combustion in said melt pool thereby producing combustion product gases; passing said combustion product gases of said submerged combustion upwardly through said bed of solids preheating and melting a portion of said solids forming melt which flows downwardly into said melt pool and partially melting a remaining portion of said solids reducing their size to a sufficiently small size to pass through said support grid openings into said melt pool."

In one preferred embodiment, a "flex flame combustion system" is used in the vitrification process. Such a burner is described, e.g., in U.S. Pat. No. 6,702,571, the entire disclosure of which is hereby incorporated by reference into this specification. Claim 1 of this patent describes: "1. A combustion system comprising: a burner body having a first fluid inlet end forming at least one primary first fluid inlet and a first fluid outlet end forming at least one first fluid outlet, said first fluid outlet oriented to deliver a first fluid to a combustion zone; an inner conduit disposed within said burner body and forming a fluid flow region between said burner body and said inner conduit, said inner conduit having a second fluid inlet distal from said first fluid outlet and a second fluid outlet proximate said first fluid outlet, said second fluid outlet oriented to deliver a second fluid to said combustion zone without first being mixed with said first fluid; internal adjustment means for adjusting a flow cross-sectional area of said first fluid disposed within said burner body; and internal pressure adjustment means for adjusting an internal pressure in said burner body, said internal pressure adjustment means comprising an interior wall disposed in said fluid flow region upstream of said first fluid outlet extending from an outer surface of said inner conduit to an inner surface of said burner body and forming at least one opening for enabling flow of said first fluid from said primary first fluid inlet to said at least one first fluid outlet, and at least one pressure altering blocking means disposed within said burner body suitable for altering flow of said first fluid through said at least one opening."

In one preferred embodiment, a submerged combustion burner is used to vitrify the material containing the electric arc furnace dust. Published U.S. patent application No. 2005/0236747 of David M. Rue et al., the entire disclosure of which is hereby incorporated by reference into this specification, discloses (in paragraph 0004) that: "The concept of submerged combustion is not new. Most of the burners that have been developed for this purpose are applicable to aqueous systems. However, burners suitable for use in the melting of high melting temperature materials, such as glass, metals, etc. are also known. U.S. Pat. No. 3,260,587 to Dolf et al. teaches a method and apparatus for submerged combustion melting of glass or similar materials in which a burner having an air cooled casing is inserted into a furnace wall, either the furnace side wall or the furnace floor. The burner is provided with means for mixing fuel gas and air, burning them and discharging the combustion products at high temperature and velocity directly into the glass. The hot gases agitate the glass, transferring a high percentage of heat to the glass, thereby rapidly melting the glass. U.S. Pat. No. 3,738,792 to Feng describes a burner for use in submerged combustion applications, which is able to use liquid fuels. In both of the '587 patent and the '792 patent, removal of the burner from the furnace for repair or replacement requires that the furnace be shut down to prevent the molten material from flowing out through the burner opening." The entire disclosure of each of such Dolf et al. and such Feng patents is hereby incorporated by reference into this specification.

Published U.S. patent application No. 2005/0236747 also discloses (in paragraph 0005) that "This problem is addressed by U.S. Pat. No. 3,563,683 to Hess which teaches a burner for use in submerged combustion applications, which includes a hollow sleeve adapted to receive the burner lining the opening in the furnace wall, which hollow sleeve is provided with passages through which a cooling fluid may flow. Upon removal of the burner from the sleeve, the cooling effect of the cooling fluid flowing through the sleeve is such that the molten material in the furnace adjacent thereto freezes, thereby preventing the molten material from escaping. U.S. Pat describes an alternative solution. U.S. Pat. No. 4,203,761 to Rose which teaches a method and apparatus for submerged combustion melting in which the burners extend downward from the furnace roof into the molten bath. In this way, issues associated with burners disposed in the furnace wall below the level of the molten material, such as burner removal and burner clogging are avoided altogether." The entire disclosure of such Rose and Hess patents is also hereby incorporated by reference into this specification.

United States published patent application No. 2005/0236747 also discloses that (in paragraph 0006) "One persistent problem associated with submerged combustion melting using burners disposed in the furnace wall below the level of the molten material is flame stability. In addition, the burners of the prior art physically protrude into the furnace, affecting not only burner service life, but also affecting mixing of the molten material in the furnace."

The solution to this problem provided by United States published patent application No. 2005/0236747 is described in claim 1 thereof, that describes: "1. In an apparatus comprising at least one wall defining a chamber containing a molten material and forming at least one opening below a surface of said molten material providing fluid communication between said molten material and a burner outlet, and a burner operably connected to said at least one wall, the improvement comprising: said burner comprising an inner fluid supply tube having a first fluid inlet end and a first fluid outlet end, an outer fluid supply tube having a second fluid inlet end and a second fluid outlet end coaxially disposed around said inner fluid supply tube and forming an annular space between said inner fluid supply tube and said outer fluid supply tube, said second fluid outlet end extending beyond said first fluid outlet end, a burner nozzle connected to said first fluid outlet end of said inner fluid supply tube having an outside diameter corresponding to an inside diameter of said outer fluid supply tube and forming a centralized opening in fluid communication with said inner fluid supply tube and at least one peripheral longitudinally oriented opening in fluid communication with said annular space, flow control means for controlling a flow of fluid within said inner fluid supply tube, and a cylindrical insert attached to said second fluid outlet end comprising at least one flame stabilizer means for stabilizing a flame produced by said burner."

In one preferred process, an abrasive is made from electric arc furnace dust. It is known that a ceramic material useful as an abrasive can be made from electric arc furnace dust. Thus, it is disclosed in U.S. Pat. No. 5,738,694 of George W. Ford, Jr. that: "EAF dust has also been processed by blending with silicate materials, such as silica sand, clay, or cullet, and heated in a furnace to form a vitrified ceramic product. The ceramic is useful as an abrasive . . . "

The Ford patent does not disclose the physical and chemical properties of the abrasive material allegedly made by its process. However, in general, this prior art process does not produce a commercially suitable abrasive with satisfactory hardness and/or toughness and/or performance properties.

In fact, the abrasive produced by the process of the Ford patent apparently has little commercial value. Ford teaches that, although "The ceramic is useful as an abrasive, and the EAF dust is rendered nonhazardous . . . the valuable metals contained in the dust are not recovered" (see lines 31-37 of Column 3 of this patent). Clearly, the abrasive material made by the process of the Ford patent is not worth as much as its metal content.

In one embodiment of the invention, described hereinbelow, there is provided an abrasive material which preferably is made by a process in which from about 40 to about 80 weight percent of electric arc furnace dust and from about 10 to about 40 weight percent of glass are mixed in a ratio of from about 2/1 to about 4.5/1 and melted at a temperature of less than about 1370 degrees Celsius. In one aspect of this embodiment, the melting temperature is preferably from about 1,260 to about 1,320 degrees Celsius.

Referring to FIG. 1, and to the preferred embodiment depicted therein, a process 10 for vitrifying electric arc furnace dust is provided. In the embodiment depicted, the electric arc furnace dust is charged to silo 12 via line 14.

One may use any of the storage bins known to those skilled in the art as silo 12 (and/or silo 28, silo 30, and/or silo 34). Thus, e.g., and by way of illustration and not limitation, one may use one or more of the portable storage bins sold by International Material Control Systems, Inc.

As is known to those skilled in the art, electric arc furnace dust is produced in the electric arc process for making steel. Reference may be had, e.g., to U.S. Pat. No. 5,738,694 of Ford et al., the entire disclosure of which is hereby incorporated by reference into this specification. As is disclosed in such patent, "Electric arc furnaces typically melt scrap metal through the use of high voltage electric current. The scrap metal may come from a variety of sources, including . . . discarded railroad rails, cut sheet steel, and scrap automobiles. The scrap metal is added to the electric arc furnaces without separating non-ferrous metals, such as lead, zinc, and cadmium. During the operation of the electric arc furnace, these non-ferrous metals are vaporized from the scrap, condensed into a dust from the waste gas stream, and are deposited in a bag house."

Electric arc furnace ("EAF") dust is well known to those skilled in the art and is described, e.g., in U.S. Pat. Nos. 5,738,684, 5,714,113, 5,698,759, 5,695,642, 5,667,553, 5,626,249, 5,605,640, 5,601,631, 5,599,378, 5,589,118, 5,569,152, 5,558,690, 5,557,031 (use of electric arc furnace dust products in concrete), U.S. Pat. No. 5,553,532 (method for recycling electric arc furnace dust), U.S. Pat. Nos. 5,538,532, 5,470,375, 5,443,788, 5,443,614, 5,403,991, 5,372,630, 5,364,447, 5,338,336 (method of processing electric arc furnace dust), U.S. Pat. Nos. 5,336,297, 5,336,297 (process for the treatment of electric arc furnace dust), U.S. Pat. Nos. 5,302,341, 5,278,111, and the like. The disclosure of each of these United States patents is hereby incorporated by reference into this specification.

In one preferred embodiment, the electric arc furnace dust is comprised of from about 1 to about 7 weight percent of chromium and from about 0.2 to about 2.0 weight percent of nickel. In one aspect of this embodiment, the electric arc furnace dust is comprised of from about 2.5 to about 4.5 weight percent of chromium and from about 0.5 to about 1.1 weight percent of nickel. The chromium and/or the nickel may be present in elemental form and/or combined with one or more other elements.

As is known to those skilled in the art, electric arc furnace dust that is comprised of from 1 to about 7 weight percent of chromium is produced when stainless steel is made by the electric arc furnace process. This dust, which is by product of such manufacture, may be obtained from any of the manufacturers of such stainless steel. A typical electric arc furnace dust from such manufacture will generally contain from about 0.3 to about 0.8 weight percent of carbon, from about 0.7 to about 1.0 weight percent of alumina, from about 0.001 to about 0.017 weight percent of cadmium, from about 8 to about 11 weight percent of calcium oxide, from about 0.8 to about 1.4 weight percent of chloride ion, from about 2 to about 5.6 weight percent of chromium, from about 0.15 to about 0.24 weight percent of copper, from about 23 to about 29 weight percent of iron, from about 0.52 to about 1 weight percent of lead, from about 7 to about 8 weight percent of magnesium oxide, from about 2.1 to about 2.8 weight percent of manganese, from about 0.5 to about 1.1 weight percent of nickel, from about 0.3 to about 0.7 weight percent of potassium, from about 4 to about 6 weight percent of silica, from about 0.4 to about 1.5 weight percent of sodium, from about 0.2 to about 0.4 weight percent of sulfur, from about 0.003 to about 0.027 weight percent of vanadium, and from about 11 to about 23 weight percent of zinc.

It is preferred, in one embodiment, that such chromium be present as an oxide. Thus, e.g., the chromic oxide may be chromium (III) oxide, chromia, chromium sesquioxide, and the like. Without wishing to be bound to any particular theory, applicant believes that, during the process of this invention, chromium molecules serve as crystallization sites for the spinels, which form at the quench.

In one embodiment, it is preferred that the electric arc furnace (EAF) dust used in the process of this invention have a particle size distribution such that at least about 70 weight percent of its particles are smaller than about 20 microns. In another embodiment, at least about 80 weight percent of the EAF dust particles are smaller than about 20 microns.

In one embodiment, the EAF dust used in the process of this invention typically contains from about 20 to about 38 percent of iron, however the iron occurs either in its elemental state or combined. Thus, e.g., it may contain black iron oxide, such as, e.g., ferrosferric oxide, ferroferric oxide, iron oxide, magnetite, black rouge, and the like. Thus, e.g., it may contain hematite (also known as red iron ore, bloodstone, or iron oxide), which is a brilliant black to blackish red or red mineral with a density of from about 4.9 to about 5.3. Thus, e.g., it may contain the iron oxide identified as Chemical Abstracts number CAS 1309-37-1.

Referring again FIG. 1, and to the preferred embodiment depicted therein, the electric arc furnace dust in silo 12 is conveyed via line 22 by mixing screw 18 to bucket elevator 24 and then to mixing screw assembly 26 that conveys the material comprising the electric arc furnace dust into batch silo 28. A metering assembly controls the amount of electric arc furnace dust fed via line 15 to mixing screw assembly 22.

Referring again to FIG. 1, and in the preferred embodiment depicted therein, glass cullet is preferably stored in silo 30 and charged via line 32 to mixing/conveying screw assembly 22. A metering assembly 31 controls the amount of glass cullet fed via line 32 to mixing screw assembly 22.

In one embodiment, the glass in silo 30 is crushed glass with a particle size distribution such that at least about 90 percent of its particles have a maximum dimension smaller than about 1.5 centimeters. In one aspect of this embodiment, at least about 95 percent of the glass particles have a maximum dimension smaller than about 2.0 centimeters. In one embodiment, at least about 85 weight percent of the glass particles have a maximum dimension smaller than about 1.5 centimeters.

In one embodiment, the crushed glass in silo 30 is glass cullet that, in one aspect of such embodiment, is tricolor glass cullet. As is known to those skilled in the art, cullet is broken or reclaimed glass; it often is fragments of scrap glass for production operations that are collected and recycled. Glass cullet is well known and is described, e.g., in U.S. Pat. Nos. 5,620,491, 5,588,978, 5,578,102, 5,558,691, 5,556,443, 5,529,594, 5,524,837, 5,498,285, 5,460,638, 5,399,181, 5,350,118, 5,342,427, 5,125,943, 4,875,919, 4,797,092, 4,793,845, 4,781,742, 4,723,979, 4,696,690, 4,549,893, and the like. The disclosure of each of these United States patents is hereby incorporated by reference into this specification.

One preferred glass cullet is soda lime glass cullet of mixed chips from residential glass recycling plants; as is known to those skilled in the art, soda lime glasses contain silica, sodium oxide, and calcium oxide. Soda lime glass cullet material is well known and is commercially available; see, e.g., U.S. Pat. Nos. 5,731,367, 5,585,452, 5,563,232, 5,538,786, 5,468,432, 5,350,778, 5,028,569 (virgin soda lime glass cullet), U.S. Pat. Nos. 4,934,307, 4,541,842, and the like. Mixtures of soda lime cullet and/or cullets comprised of other glasses (and colors) may also be advantageously used. The disclosure of each of these United States patents is hereby incorporated by reference into this specification.

Instead of using soda lime glass and/or soda lime glass cullet, one may additionally, and/or alternatively use, other glass compositions such as borosilicate glass, aluminosilicate glass, Vicor glass, fused silica glass, borax glass, transparent mirror glass, mixtures thereof, and the like. These and other glasses are described on pages 376-382 of George S. Brady et al.'s "Materials Handbook," Thirteenth Edition (McGraw-Hill, Inc., New York 1991).

Regardless of which glass or glasses are used, in one embodiment it is preferred to charge from about 20 to about 40 weight percent via line 32, by weight of total material in mixing assembly 22, and more preferably from about 10 to about 30 weight percent of such glass is charged to the mixer 22. The electric arc furnace dust and the glass are charged so that their weight/weight ratio is from about 2.0/1 to about 4.5/1.

Referring again to FIG. 1, and in the preferred embodiment depicted therein, from about 0 to about 35 weight percent of foundry sand is stored in silo 34 and fed via metering assembly 33 to line 36 and thence to mixer 22. As is known to those skilled in the art, foundry sand is often also referred to as silica sand.

Referring again to FIG. 1, and in one embodiment thereof, from about 10 to about 30 weight percent of silica sand, by total weight of all ingredients in mixer 22, is charged to mixer 22. This silica sand preferably has a particle size distribution such that at least about 70 percent of its particles range in size from about 0.05 to about 2.0 millimeters.

In one embodiment, the silica sand in silo 34 is present in an admixture with a binder. In general, when such binder is present, less than about 15 weight percent of binder (by total weight of binder and silica sand) is present in the foundry sand mixture.

In one preferred embodiment, the silica sand in silo 34 is foundry sand. Foundry sand is preferably comprised of silica sand and one or more proprietary binder ingredients. By way of illustration, a typical green foundry sand is comprised of about 80 weight percent of silica sand, about 10 percent of binder (such as bentonite clay), from about 12 to about 5 weight percent water, and about 5 weight percent of sea coal (a carbonaceous mold additive to improve casting finish).

In one preferred embodiment, where silica sand is charged to mixer 22, the composition in mixer 22 contains from about 37 to 43 weight percent of silica.

Silica sand is well known to those skilled in the art and is described, e.g., in U.S. Pat. Nos. 5,613,453, 5,551,632, 5,492,548, 5,476,416, 5,472,500, 5,426,145, 5,411,352, 5,334,364, 4,401,638, 3,856,213, and the like. The disclosure of each of these United States patents is hereby incorporated by reference into this specification.

Referring again to FIG. 1, it will be seen that from about 0 to about 15 percent, and more preferably from 1 to about 10 weight percent, of glass flux material may be charged to mixer 22 via line 38. As is known to those skilled in the art, a flux is a substance added to a refractory material to aid in its fusion. One may use any of the conventional glass fluxes commonly available such as, e.g., the glass fluxes disclosed in U.S. Pat. Nos. 5,613,453, 5,551,632, 5,492,548, 5,476,416, 5,472,500, 5,426,145, 5,411,352, 5,334,364, 4,401,638, 3,856,213, and the like. The entire disclosure of each of these United States patents is hereby incorporated by reference into this specification.

Other reagents also may be added to the mixture in mixer 22. Thus, by way of illustration, one may charge from about 5 to about 10 weight percent of alumina, by total weight of material in the mixer and, more preferably, from about 5.5 to about 8.5 weight percent of alumina. In this embodiment, at least about 70 percent of the alumina particles are preferably smaller than 20 microns. Thus, e.g., one may add additional iron to the mixture, preferably in a combined thereof such as iron oxide.

Referring again to FIG. 1, the glass mixture in mixer 22 is conveyed via screw 18 to silo 28. In the embodiment depicted, a bucket elevator 24 and a screw conveyor 26 is used to charge the mixture to silo 28. It is preferred to maintain the material in mixer 22 and bucket elevator 24 and screw assembly 26 within a substantially closed environment such that small particulates in the mixture do not escape.

The glass batch (charge) in silo 28 is metered by metering assembly 29 and fed via screw conveyor 40 to melter 42.

One may use any of the glass melters known to those skilled in the art. In one preferred embodiment, the submerged combustion furnace described elsewhere in this specification is used.

In one embodiment, the melter 42 has a low velocity exhaust. Furnaces with low velocity exhaust are well known to those skilled in the art; see, e.g., U.S. Pat. No. 4,410,996, the entire disclosure of which is hereby incorporated by reference into this specification.

In one embodiment, it is preferred to maintain the glass melt within the furnace at a depth of at least about 30 inches and, more preferably, at least about 36 inches.

In the preferred embodiment depicted in FIG. 1, gas is preferably fed into melter 42 via line 44. In order to support combustion within the melter 42, it is preferred to feed a mixture of oxygen and natural gas into such melter 42. In one embodiment, about 2.1 parts of oxygen per part of natural gas is fed via such line 44. In one aspect of this embodiment, the oxygen is flowed into the melter 42 at a rate of 42,000 standard cubic feet per minute, and the natural gas is fed into the melter 42 at a rate of 20,000 standard cubic feet per minute. In order to produce about 100 tons per day from melter 42, it is preferred to feed about 4.25 tons per hour of charge from silo 28 into the melter.

In order to ensure an oxidizing environment in the melt, excess oxygen over that needed to combust the methane and burn organic carbon in the charge must be present. The exact rate of oxygen flowing into the burner is controlled to produce a partial pressure of oxygen in the exhaust gases equal to between 2 and 5.5 kPa.

It is also preferred to maintain the internal temperature within melter 42 at from about 1200 to about 1320 degrees Celsius. The residence time of the charge within the melter 42 is from about 3 to 7 hours and, more preferably, from about 4 to about 6 hours.

The atmosphere within the melter 42 is preferably comprised of the oxygen and natural gas fed into the melter 42 as well as gaseous combustion products, including carbon monoxide, carbon dioxide, water, and oxides of nitrogen. Other combustion gases, such as, e.g., coal gas, also may be used.

The gaseous products formed during the melting process are preferably exhausted via line 46 to baghouse 48 and thence through exhaust stack 50 or directly through exhaust stack 50. The controller 52 is operatively linked to a sensor 54 that monitors conditions within the melter and/or exhaust and, when appropriate, varies the rate of feed of natural gas and/or oxygen and/or charge and/or electric arc furnace dust and/or glass cullet and/or foundry sand.

Without wishing to be bound to any particular theory, applicant believes that, as the pressurized gas, oxygen, and exhaust gases bubble through the melt in the melter 42 prior to the time they are exhausted, they intimately and thoroughly mix the reagents. Without being bound to any particular theory, applicant believes that this intimate mixing in the presence of oxygen produces a product in melter 42 that is substantially different than prior art melts. The Gas Technology Institute of DesPlanes, Ill. has a submerged combustion melter that has such features, and they have several patent applications and/or patents that describe such melter; some of these patent documents are described elsewhere in this specification.

It is believed that, in one embodiment, a glass-ceramic material is formed in melter 42. The molten material, at a temperature of from about 1200 to about 1320 degrees Celsius, and a viscosity of from about 100 to about 10,000 poise, is discharged from melter 42 via line 52 to quencher 54.

The molten material exits from melter 42 to quencher 54 through a heated orifice with an internal diameter of 1.5 inch.

One may use any of the conventional glass quenching devices and processes known to those skilled in the art such as, e.g., the devices and processes disclosed in U.S. Pat. Nos. 5,556,444, 5,507,852, 5,498,275, 4,363,646, 5,769,918, 5,552,221, 4,617,043, and the like. The disclosure of each of these United States patents is hereby incorporated by reference into this specification.

It is preferred, when quenching the molten material from melter 42, that the temperature of the withdrawn molten mass melt be reduced from its initial temperature (of from about 1,150 to about 1,250 degrees Celsius) to a temperature of 650 to about 850 degrees Celsius in about 10 to 30 seconds. This can be accomplished by conventional quenching technology such as, e.g., the quenching systems described in the patents in the prior paragraph. Alternatively, or additionally, one may use other quenching means.

In one embodiment, one may withdraw molten material from melter 42 into a molten stream and blast one more streams of water against it. In one embodiment, the pressure of the water is from about 40 to about 60 pounds per square inch.

In one embodiment, one may tap the molten material in the melter from the bottom of a forehearth into an inclined conveyor containing recirculation water that contains a rotating screw that transports the material up the incline out of the water.

Referring again to FIG. 1, the quenched material in quencher 54 is preferably at a temperature of from about 650 to 850 degrees Celsius. The material at this temperature, which is no longer molten, is then preferably annealed in annealer 56.

Figure 2:
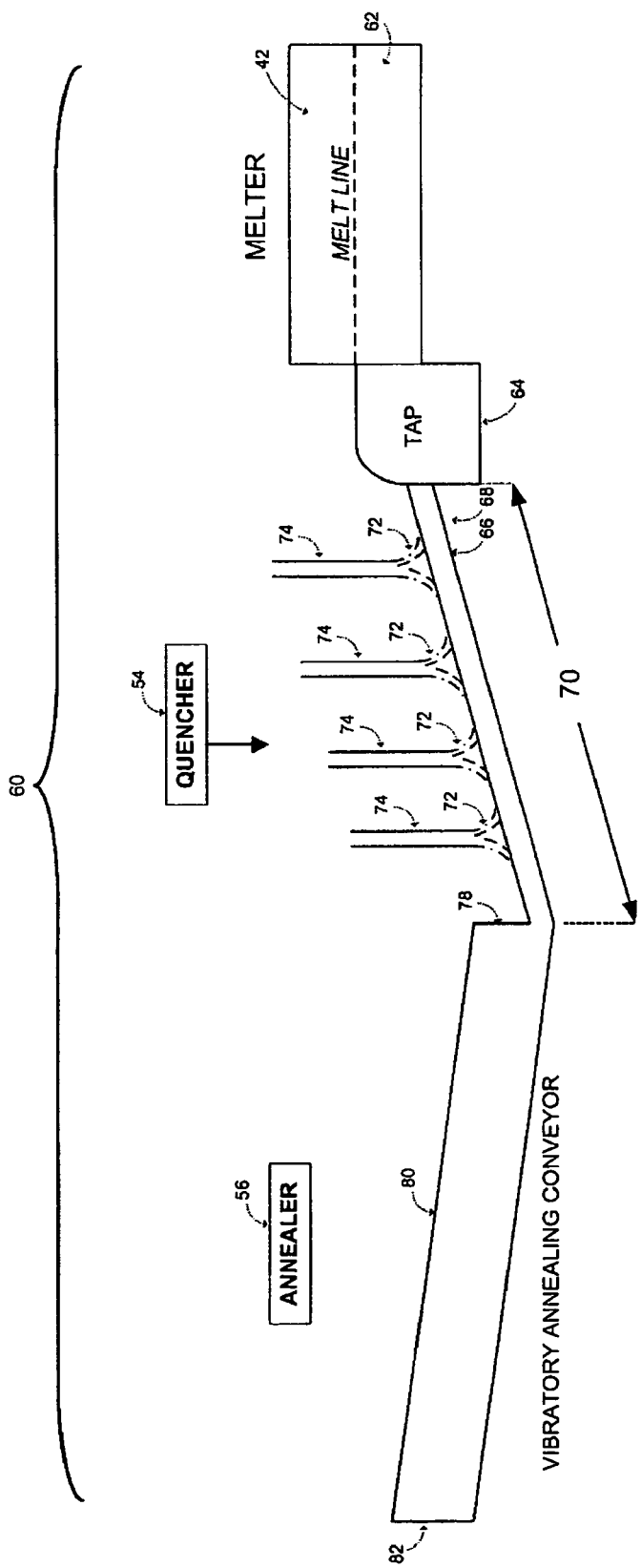
FIG. 2 is a schematic of another preferred process of the invention.

FIG. 2 is a schematic drawing of one preferred quenching/annealing process 60.

In one preferred embodiment, the trough 66 is hingeably attached to the tap 64 so that the angle 68 may be varied to adjust the flow of the molten material. The trough 66 preferably has a length 70 of from about 6 to about 10 feet. As the molten material descends down the trough 66, it is sprayed with water 72 from pipes 74. The water is preferably at ambient temperature, and the pipes 74 are preferably disposed from about 4 to about 10 inches above the top surfaces of the molten material. In one embodiment, the pipes 74 are disposed about two feet apart, and they have an internal diameter of about 0.5 inches.

As indicated elsewhere in this specification, the temperature of the molten material decreases at about 400 degrees Celsius from point 76 on the trough 66 to point 78 on the trough 66. At point 76 on the trough 66, the material is substantially molten. At point 78 on the trough 66, the material is substantially solid.

Referring again to FIG. 2, the substantially solid material at point 78 is then fed to a vibratory conveyer 80. The vibratory conveyor 80 conveys material from point 78 to point 82. The material at point 78 is generally at a temperature of from about 650 to about 850 degrees Celsius. The material at point 82 of the vibratory conveyor 80 is preferably at a temperature of from about 450 to about 650 degrees Celsius and generally at a temperature that is at least about 100 degrees lower than the temperature of such material at point 78.

Without wishing to be bound to any particular theory, applicant believes that the amount of time it takes the material to travel from point 78 to point 82 is important. It is preferred that the material be dried and annealed in such device for at least about 1 minute and, more preferably, from about 2 to about 6 minutes.

Referring again to FIG. 1, the material is annealed in annealer 56, preferably in accordance with the procedure illustrated in FIG. 2. However, other annealing processes and/or devices may also be used.

The annealed material from annealer 56 is then passed via lines 90 and/or 92 to either crusher 94 or impact mill 96. In one embodiment, particles with a maximum dimension greater than 0.8 inches are fed to the crusher 94, and particles with a maximum dimension less than 0.8 inches are fed to the impact mill 96. In one aspect of this embodiment, the particles fed to the impact mill 96 preferably have a size of from about 0.3 to about 0.8 inches.

The crusher 94 is preferably utilized to reduce the size of the particles in it to a size such that at least about 80 weight percent of its particles are preferably smaller than about 0.75 inches. This crushed material is then fed via line 95 to impact mill 96, wherein the size of the particles are then further reduced such that at least about 95 weight percent of such particles are preferably smaller than about 2.0 millimeters.

Crusher 94 may be any of the crushers available to those skilled in the art. By way of illustration and not limitation, one may use a "Grand Slam Secondary Impact Crusher" manufactured by the Stedman Machine Company of Aurora, Ind.

Impact mill 96 may be any of the impact mills known to those skilled in the art. Thus, e.g., the impact mill used may be a "V-Slam Vertical Shaft Impacter" manufactured by such Stedman Machine Company of Aurora, Ind.

The material produced in impact mill 96 is then conveyed to siever 100 wherein the material may be classified and/or recombined to produce the desired particle size distribution. In one embodiment, a "Multi-Vib Screener" is used to provide the desired particle size distribution. Midwestern Industries, Inc. of Massillon, Ohio, manufactures this screening/classifying device.

In one embodiment, the abrasive material produced by the process of this invention contains less than about 10% of fine material less than 125 microns in size. This fine material, if necessary, may be removed by the classifier, in whole or part, to produce the desired consist. However, it has been discovered that this fine material, in and of itself, has desirable characteristics and may be utilized as an abrasive for certain applications. In general, and in one preferred embodiment, this fine material has a particle size distribution such that at least about 50 percent of its particles have a maximum dimension within the range of from about 45 to about 125 microns.

In one embodiment, the composition produced by the process of this invention is a glass ceramic composition. As used in this specification, the term "glass ceramic" refers to a hard, strong, nucleated glass with a nonporous, crystalline structure that has a high flexural strength and shock resistance. The glass ceramic composition of this embodiment is preferably crystallized in situ from a thermally crystallizable glass batch comprising from about 40 to about 80 weight percent of electric arc furnace dust and from about 10 to about 40 weight percent of glass, wherein said electric arc furnace dust and said glass are in a weight/weight ratio of from about 2/1 to about 4.5/1.

In one embodiment, the abrasive composition of this invention has a Vickers hardness of at least about 550 HV. It is preferred, however, that the composition of this invention has a Vickers hardness of at least about 620 HV.

In one preferred embodiment the Vickers Hardness from about 620 to about 700 HV.

Means for determining Vickers hardness are well known to those skilled in the art and are described, e.g., in U.S. Pat. Nos. 5,066,619, 5,028,567, 4,985,375, 4,861,657, 4,575,493, 3,657,780, and the like; the disclosure of each of these United States patents is hereby incorporated by reference into this specification. It is preferred to conduct hardness testing with a Vickers diamond indenter in open atmosphere conditions with a 200-gram load and 15-second dwell time.

The abrasive composition of this embodiment of the invention preferably has a density of from about 3.0 to about 4.5 grams per cubic centimeter and, more preferably, from about 3.0 to about 4.1 grams per cubic centimeter.

In one embodiment, the abrasive composition typically contains from about 20 to about 40 percent of iron, however it occurs, either in its elemental state or in combined form. In another embodiment, the abrasive composition contains from about 20 to about 40 weight percent of iron compound selected from the group consisting of ferrous oxide, ferric oxide, iron-containing spinel, calcium iron silicate, and mixtures thereof. In one preferred embodiment, the composition contains from about 23 to about 37 weight percent of such iron compound.

In one embodiment, the abrasive composition of this invention is comprised of from about 0.05 to about 0.5 weight percent of potassium oxide and from about 2 to about 8 weight percent of calcium oxide.

In one embodiment of the invention, the abrasive composition is environmentally safe; such composition does not exceed the United States Environmental Protection Agency's TCLP (toxicity characteristics leaching procedure). As is known to those skilled in the art, the Environmental Protection Agency has published a test (at 40 Code of Federal Regulations [C.F.R.] 268.7[a]) for determining the leachability of hazardous substances in a material; this test is often referred to as EPA SW846 Method 1311. In this test, approximately a 100-gram sample of the material is placed in a one-liter glass jar which thereafter is filled with acetic acid, the jar is then rotated at 30 revolutions per minute for 18 hours, and the water in the jar is then tested for the presence of various elements. This test is well known and is described, e.g., in U.S. Pat. Nos. 5,769,961, 5,766,303, 5,762,891, 5,754,002, 5,744,239, and the like; the disclosure of each of these United States patents is hereby incorporated by reference into this specification.

When a 100-gram sample of this embodiment is tested for leachability in accordance with the aforementioned test, a typical analysis indicates that less than 0.001 parts per million of mercury is detected in the water, less than about 2 parts per million of barium is detected in the water, no selenium is detected in the water, less than 1 part per million of lead is detected in the water, less than 0.2 parts per million of chromium is detected in the water, less than 0.05 parts per million of cadmium is detected in the water, less than 0.2 parts per million of arsenic is detected in the water, less than 0.1 parts per million of silver is detected, and less than 0.2 parts per million of selenium is detected.

U.S. Pat. No. 5,964,911 describes an abrasive composition that contains at least about 60 weight percent of ferrometasilicate. By comparison, and in one preferred embodiment thereof, the abrasive composition of this invention preferably contains less about 10 weight percent of ferrometasilicate and, more preferably, less than about 5 weight percent of ferrometasilicate. In one preferred embodiment, the abrasive composition of this invention contains less than about 2 weight percent of ferrometasilicate and, more preferably, less than 1 weight percent of ferrometasilicate.

U.S. Pat. No. 5,964,911 describes an abrasive composition that contains at least about 75 weight percent of crystalline material. By comparison, and in one preferred embodiment, the abrasive composition of this invention contains less than about 65 weight percent of crystalline material.

The abrasive material of this invention, when used as blasting abrasive, creates substantially less dust than does the prior art abrasive materials. As used herein, the term dust refers to particles smaller than 45 microns. In one embodiment, the abrasive material of this invention loses less than about 10 percent of its weight as dust for each cycle of its use.

In one embodiment, the composition of this invention can be used as roofing granules. In this embodiment, it is preferred the particle sizes of the granules range from about 0.2 to about 2.0 millimeters. The roofing granules of this invention may replace prior roofing granules in such structures such as those disclosed, e.g., in U.S. Pat. No. 5,516,573 (roofing granules embedded in asphalt), U.S. Pat. Nos. 5,382,449, 4,380,552, 5,206,068, and the like. The disclosure of each of these United States patents is hereby incorporated by reference into this specification.

In another embodiment, the composition of this invention can be used as a proppant; thus, it can be suspended in drilling fluid during the fracturing portion of the drilling operation to keep the fracture open when fluid is withdrawn. Thus, e.g., such composition may be used as a proppant in one or more of the applications disclosed in U.S. Pat. Nos. 5,620,049, 5,604,194, 5,597,043, 5,595,245, 5,582,250, 5,575,335, 5,562,160, 5,558,161, 5,531,274, 5,515,920, and the like. The disclosure of each of these United States patents is hereby incorporated by reference into this specification. In one aspect of this embodiment, the particle size of the proppant particles used is from about 0.2 to about 3.0 millimeters.

In another embodiment, the composition of this invention can be used to manufacture foam glass. As is known to those skilled in the art, foam glass is a light, black, opaque cellular glass made by adding powdered carbon to crushed glass and firing the mixture. Thus, one may use the composition of this invention in one or more of the processes or structures described in U.S. Pat. No. 5,069,960 (foam glass tile), U.S. Pat. No. 5,990,398 (foam glass tile), U.S. Pat. No. 4,833,015 (multilayer foam glass structure), U.S. Pat. No. 4,798,758 (foam glass with crust layer), U.S. Pat. Nos. 4,703,019, 4,430,108, 4,430,107, 4,124,365, 4,038,063, 4,024,309 (foam glass structural element), U.S. Pat. Nos. 3,975,174, 3,951,632, 3,811,851, 3,767,377, and the like. The disclosure of each of these United States patents is hereby incorporated by reference into this specification.

In one preferred embodiment, the composition of this patent is used to make foam glass structural elements or foam glass panels, such as those described in U.S. Pat. Nos. 4,024,309, 5,464,114, 4,557,090, 4,463,043, 3,628,937, and the like. The disclosure of each of these United States patents is hereby incorporated by reference into this specification.

EXAMPLE

The following example is used to illustrate the claimed invention but is not to be deemed limitative thereof. Unless otherwise specified, all parts are by weight, and all temperatures are in degrees Celsius.

A granular batch was prepared by blending various components. The granular batch was comprised of electric arc furnace dust, granular spent foundry sand, and tri-color glass cullet.

The electric arc furnace dust used was obtained from Steel Dynamics, Inc., Structural and Rail Division, Columbia City, Ind. This electric arc furnace dust contained 30.4 weight percent of total iron, 13.9 weight percent of total zinc, 7.5 weight percent of total calcium, 3.0 weight percent of total magnesium, 2.6 weight percent of total manganese, 1.4 weight percent of total lead, 0.80 weight percent of total sodium, 0.48 weight percent of total potassium, 0.39 weight percent of total aluminum, 0.36 weight percent of total copper, 0.28 weight percent of total silicon, 0.28 weight percent of total chromium, and lesser amounts of cadmium, thallium and others. As used herein, the term "total" refers to the total concentration of the cation in question, regardless of whether it occurred in its elemental form or in a combined form, such as an oxide of the cation. The electric arc furnace dust contained also 1.1 weight percent of total organic carbon. The aforementioned values represented an average of five (5) determinations on five (5) separate drums of electric arc furnace dust used in the experiment.

Spent foundry sand used to make cast metals was obtained from Casting Service, 300 Philadelphia St., LaPorte, Ind.; the sand had been reconditioned to remove some binder and waste material. The reconditioned sand, in addition to silica, contained 0.48 weight percent of iron, 0.3 weight percent of chromium, 0.19 weight percent of aluminum, 0.08 weight percent of magnesium, 0.08 weight percent of calcium, and 0.05 weight percent of nickel. The sand also contained less than 1 weight percent of organic carbon and less than 1 weight percent of moisture; and it had a particle size distribution such that more than 95 weight percent of such sand had a maximum dimension equal to or less than 850 microns.

The glass cullet used in the experiment described in this example was post-consumer tri-color glass cullet that was obtained from Recycle America, 10330 S. Woodlawn Ave, Chicago, Ill. This cullet, in addition to silica, contained 9.9 weight percent of sodium, 7.5 weight percent of calcium, 1.0 weight percent of aluminum, 0.59 weight percent of potassium, 0.54 weight percent of magnesium, 0.31 weight percent of iron, 0.04 weight percent of barium, 0.03 weight percent of nickel, less than 0.03 weight percent of manganese, and 0.02 weight percent of zinc. The cullet had 2.6 weight percent moisture content. Ninety-four (94) weight percent of the cullet particles had a maximum dimension less than ⅜th inch.

The electric arc furnace dust, foundry sand, and cullet were blended in a 60%/20%/20% weight/weight/weight ratio to produce a blended batch of which 900 pounds was used in the experiment; the batch was mixed by hand in a drum to produce a substantially homogeneous blend. The moisture in the cullet caused the very fine particles of the electric arc furnace dust to adhere to each other, and other larger particles in the batch and did not create a dust while mixing.

The 900 pounds of blended batch thus produced were loaded into the top of the pilot submerged combustion melter owned and operated by the Gas Technology Institute and located at their research facility at 1700 S. Mt. Prospect Rd., Des Plaines, Ill. Five-gallon buckets were used to transfer the blended batch into the top of the submerged combustion melter. During such loading, the two oxy-methane submerged burners of such melter were fired. The temperature in the furnace was increased from ambient until the temperature of the exhaust gas reached 1,150 degrees Celsius over a period of one hour. The melter was held at that temperature for 1 hour. Then the temperature was increased such that exhaust gas read 1,180° Celsius. The batch was maintained at this temperature for an additional 30 min. During the two and one half hours that the batch was in the melter, the batch/melt was mixed by the bubbling of combustion gas products produced by the submerged burners of the melter through the batch/melt.

The submerged burners in the melter were controlled to achieve an oxidative environment in the melt and to 'burn' any organic carbon material. The exhaust gas was constantly monitored for oxygen content, and the flow of gases to the burners was controlled so that the exhaust gas maintained a partial pressure of oxygen of between 2 and 5.5 kPa.

After two and one half hours in the melter, the melt was tapped from the side of the melter, about 7 inches above the floor of the furnace. It was necessary to use this side tap of the furnace in order to attach an inclined water-cooled trough which itself was attached to a vibratory conveyor. A consequence of the use of this tap location was that the bottom 7 inches of melt was unavailable for tapping into the quench/anneal system. The intent was to tap at a temperature such that the viscosity of the melt was 1,000 poise.

The temperature of the melt exiting the orifice as well as the temperature of the frit at various locations was measured using a Cyclops 100 portable infrared digital thermometer.

The melt was tapped through a 3-inch opening in a ceramic orifice with a movable water-cooled gate; the movement of the gate controlled the size of the orifice and, thus, the flow rate of the melt. As the melt exited the orifice, the temperature was determined to be 1170 degrees Celsius.

As the melt was tapped the remaining column of melt in the furnace decreased, resulting in both less mass to absorb the heat from the burners and less pressure on the melt exiting the orifice. The burners were monitored and adjusted to control the temperature and to enable a continuous flow of melt through the tap.

The withdrawn melt dropped down an inclined trough sprayed with water jets and into a trough of a vibratory conveyor; there was about 1 centimeter depth of water at the beginning of the conveyor. The melt landed in the pool of water and quickly moved, via the vibratory conveyor, at a small upward incline, out of the water and up the twenty-foot length of conveyor system. The temperature of the melt as it landed at the bottom of the tapping trough was 1020° Celsius. The melt hardened but retained red heat over at least half the length of the vibratory conveyor, drying as it annealed. Frit exited the vibratory conveyor at temperatures between about 300 to 500° Celsius. It typically took between 10 and 30 seconds for the melt to exit the tap, traverse the tapping trough, and enter and exit the small pool of water at the beginning of the vibratory conveyor; this was the "quench period." It took between 2 and 6 minutes for the frit to travel the length of the vibratory conveyor and exit the end; this was the "annealing/drying period." The variation in time it took frit to travel the length of the conveyor was primarily due to differences in dimension of frit.

The yield of the frit from this tap was 490 pounds. The frit so produced contained particles with maximum dimensions greater than 0.5 inch. Half of this "oversize material" was comminuted in a Steadman Machines Company (129 Franklin Street, Aurora, Ind.) Grand Slam Impact Crusher, and then crushed again in the Stedman Machines Company 36" V-Slam Impact mill. Both impact mills used were those available at their test facility in Aurora, Ind. The other half of the +0.5 inch frit was comminuted in the V-Slam impact mill twice.

Frit with dimensions less than ⅜ inch was comminuted once with the 36" V-Slam Impact mill. The small amount of frit with dimensions between ½ inch and ⅜ inch was reserved for future testing. The particles from both comminution schemes described above were combined prior to grading and separating.

The comminuted particles were then graded and separated using Midwestern Industries, Inc. of Massillon, Ohio, Multi-Vib industrial sieve/screening and vibratory separator at their test facility. The test model is a 3'×5' unit with 5 screen decks. The screens were tensile bolting cloth with mesh size 20, 40, 60, 80, and 120 and mesh openings 0.0410 inch, 0.0185 inch, 0.0122 inch, 0.0088 inch and 0.0058 inch, respectively.

Two test runs of grading the comminuted material were run using tensile bolting cloth screens, and the results were combined. Forty-two (42) weight percent of the blended material was retained on mesh size 20; 23 weight percent passed mesh size 20 and was retained on mesh size 40; 12 weight percent passed mesh size 40 but was retained on mesh size 60; 8 weight passed mesh size 60 but was retained on mesh size 80; 6 weight percent passed mesh size 80 but was retained on mesh size 120; and 8 weight passed mesh size 120 onto the pan.

For the particles that passed mesh size 120, Midwestern Industry, Inc.'s ME48 Gyra-Vib Separator with two screen decks was used to separate these particles into smaller particle grades. Of the particles that passed the 120-mesh screen, 44 weight percent passed 120 mess and were retained on 165 mesh (0.0042 inch opening); 18 weight percent passed 165 mesh but were retained 230 (0.0029 inch opening); and the remaining 38 weight percent passed through the 230 mesh screen onto the pan.

The comminuted and classified products were analyzed. They had a black color, a specific gravity of from 3.4 to 3.6 grams per cubic centimeter, a bulk density of from 124 to 128 pounds per cubic foot, a Mohs hardness of from greater than 6.0 to 8, a Vickers Hardness of from 620 HV to 700 HV, and a melting point in excess of 1,440 degrees Celsius (the temperature at which the last crystal in the composition disappears into the melt). At least 80 (counted) percent of such particles had a blocky shape.

The Unified Abrasive Manufacturer's Association web site (see www.UAMA.org) defines blocky shape with high bulk density as having an aspect ratio of approximately 1:1, blocky shape with medium bulk density as having aspect ratio of up to 1.5:1 and sharp shape with low bulk density as having aspect ratio greater than 1.5:1 up to 3:1. Using a Digital Blue QX5 Computer Microscope attached to a MacBook Pro laptop computer via USB port, particles of various grades were analyzed for aspect ratio. One hundred particles of each grade were analyzed manually by measuring dimensions of the particles as they appeared on the 2-dimensional screen. For particles that passed US Sieve 16 and were retained on US Sieve 20 (nominally 850 to 1180 mm dimension), 55% exhibited blocky high bulk density shape, 31% exhibited blocky medium density shape, and 14% exhibited sharp shape low bulk density. For particles that pass US Sieve 40 and were retained on US Sieve 50 (nominally 300 to 425 mm dimension), 54% exhibited blocky high bulk density shape, 28% exhibited blocky medium density shape, and 18% exhibited sharp shape low bulk density. For smaller particles, those that passed US Sieve 80 but were retained on US Sieve 100 (nominally 150 to 180 mm dimension), 43% exhibited blocky high bulk density shape, 35% exhibited blocky medium density shape, and 22% exhibited sharp shape low bulk density.

The comminuted and classified products contained 21 weight percent of iron, 11 weight percent of zinc, 4 weight percent of calcium, 2 weight percent of aluminum, 2 weight percent of sodium, 1.6 weight percent of manganese, 1.4 weight percent of magnesium, 0.5 weight percent of lead, 0.5 weight percent of potassium, and smaller amounts of copper, nickel and vanadium, among others.

Petrographic analyses by polarized light microscopy (PLM) and scanning electron microscopy analysis (SEM/EDX) were conducted on the frit produced in the submerged combustion melter to determine its chemical composition. The product contained mixed metal synthetic spinel crystals, both equiaxed and dendritic, a calcium-iron-silicate phase, chromite grains, and residual glass.

The synthetic spinel crystals in the frit were, for the most part, completely opaque to transmitted light, even when viewed in extremely thin sections of less than 10 μM thickness. SEM/EDX analysis was used to determining the composition of these crystals. Equiaxed crystals contained, in decreasing amounts, iron, zinc, chromium, and manganese. The dendritic spinel phase contained iron, zinc, manganese and some aluminum. In addition, the dendritic spinel analysis showed small amounts of silicon, calcium, magnesium and sodium from x-rays from the overlap glass phase adjacent to the small crystals.

Chromite-like grains were found in the frit, and they contained chromium, iron, aluminum, magnesium, zinc and titanium.

A trace level of calcium was consistently detected in the product.

A pale green anisotropic (i.e.: birefringent) phase was found in all samples. The crystals were on the small end of the scale so the resultant EDX spectrographs contained some components of the surrounding glass phase. The EDX spectrograph of the anisotropic crystal phase contained elevated silicon, calcium and iron and was depleted in Zn, Na, Al, Mg, Mn, Cu and Pb with respect to the base glass.

The comminuted particles were tested in accordance with EPA SW-846 analytical method (Method 1311) that simulated contaminant leaching in samples. Based upon the guidelines set forth in 40 CFR 261.4, these particles produced were non-hazardous. Representative results of such tests carried out on particles less than 65 microns diameter demonstrated all products produced fall well below EPA limits, and they contained: less than 0.20 mg/L arsenic, less than 0.7 mg/L barium, less than 0.01 mg/L cadmium, less than 0.1 mg/L chromium, less than 0.6 mg/L lead, less than 0.001 mercury, less than 0.2 mg/L selenium and less than 0.1 mg/L silver.

The uncomminuted frit was analyzed for temperature versus viscosity and the temperature at which the melt exhibited viscosity of 1000 poise was determined to be between 1210 and 1230° Celsius.

A TCLP extraction was carried out on particles less than 75-micron diameter for iron. The leachate was found to contain 20 mg/L of iron.

The particles were blended into commercially recognized sizes for test blasting as an abrasive. Tests were conducted in two categories of blasting: open blasting and closed circuit blasting. The more cycles an abrasive can endure, the greater its productivity. Abrasives for open blasting generally were of larger particles and a wider range of particle sizes and used at greater blasting pressures (85 to 100 psi.). Closed circuit blasting involved blast cleaning in special built cabinets wherein the part being cleaned was placed in the cabinet. Abrasives for this type of blasting generally have a narrow range of particle size, use smaller particles, and are used at lower blasting pressures (40 p.s.i.).

A room for open blast testing was built at BGRS, Inc., 10440 Windfern Road, Houston Tex., wherein the abrasives used were collected. Open blasting testing was conducted on various levels of rusted steel with abrasive material made in substantial accordance with the procedure of this example and garnet, coal slag and copper slag purchased on the open market from Clemtex, Inc. at 248 McCarthy Drive, Houston Tex. Abrasives in the 40-80-size range were blasted at 85 p.s.i., 85 degrees, and 20 inches with a #6 nozzle. The abrasive material made in substantial accordance with the procedure of this Example produced less visible dust than all the other abrasives and cleaned to a white metal finish rapidly. The speeds at which the product worked were faster than the purchased abrasives. The product consumption for the abrasive material made in substantial accordance with the procedure of this example was 5-10% per cycle for a 40-80 blend, whereas Barton garnet #80 consumed at much higher levels, 20% or more for one cycle.

Abrasive material made in substantial accordance with the procedure of this example was tested in a blasting cabinet at Omni Finishing Systems, Inc., 163 Railroad Drive, Ivyland, Pa. Closed circuit testing was conducted on tight scale rust with such abrasive material and with aluminum oxide purchased from Omni. Both such abrasive material and aluminum oxide abrasives in four size ranges were blasted at 40 p.s.i., 85 degrees, and 12 inches with a #4 nozzle. Both produced little dust and cleaned to a white metal finish. The speeds at which the abrasives worked were comparable. The product consumption for such abrasive material was 8-13% per cycle, whereas the aluminum oxide consumed at 5-10% per cycle.

It is to be understood that the aforementioned description is illustrative only and that changes can be made in the apparatus, in the ingredients and their proportions, and in the sequence of combinations and process steps, as well as in the other aspects of the invention discussed herein, without departing from the scope of the invention as defined in the following claims.

I claim:

1. A composition with a Mohs hardness of at least 6.0, wherein said composition is comprised of at least 30 weight percent of spinel crystals, at least 10 weight percent of glass, and less than about 10 weight percent of ferrometasilicate, wherein said composition comprises at least 95 weight percent of particles with a particle size smaller than about 2.0 millimeters, wherein at least about 70 weight percent of said particles have a particle shape selected from the group consisting of blocky particle shape, pyramidal particle shape, and mixtures thereof, and wherein:
(a) at least 20 weight percent of said spinel crystals are equiaxed spinel crystals,
(b) the weight/weight ratio of said spinel crystals to said glass is at least 1.2/1,
(c) said composition has a melting point in excess of 1300 degrees Celsius,
(d) said composition has a density of from about 3.0 to 4.5 grams per cubic centimeter, and
(e) said composition is comprised of from about 1 to about 20 weight percent of a calcium iron silicate.

2. The composition as recited in claim 1, wherein said composition is an abrasive composition.

3. The composition as recited in claim 1, wherein said composition is comprised of at least about 35 weight percent of spinel crystals.

4. The abrasive composition as recited in claim 1, wherein said composition is comprised of at least 25 weight percent of glass.

5. The composition as recited in claim 1, wherein said composition is comprised of less than 0.2 weight percent of crystalline silica.

6. The composition as recited in claim 1, wherein at least about 80 weight percent of said particles have a particle shape selected from the group consisting of blocky particle shape, pyramidal particle shape, and mixtures thereof.

7. The composition as recited in claim 1, wherein said spinel crystals are comprised of equiaxed spinel crystals and dendritic spinel crystals.

8. The composition as recited in claim 1, wherein said composition is comprised of at least about 40 weight percent of said equiaxed spinel crystals.

9. The composition as recited in claim 1, wherein said composition is comprised of from about 50 to about 80 weight percent of said spinel crystals and from about 20 to about 560 weight percent of said glass.

10. The composition as recited in claim 7, wherein at least about 20 weight percent of said spinel crystals are dendritic spinel crystals.

11. The composition as recited in claim 7, wherein the weight/weight ratio of said dendritic spinel crystals to said equiaxed spinel crystals is at least about 1/5.

12. The composition as recited in claim 1, wherein said equiaxed spinel crystals have a maximum dimension of from about 10 to about 70 microns.

13. The composition as recited in claim 1, wherein said spinel crystals are comprised of chromite crystals.

14. The composition as recited in claim 1, wherein said spinel crystals are comprised of iron.

15. The composition as recited in claim 14, wherein at least about 50 weight percent of said composition is comprised of iron-containing spinel crystals.

16. The composition as recited in claim 14, wherein at least about 60 weight percent of said composition is comprised of iron-containing spinel crystals.

17. The abrasive composition as recited in claim 1, wherein said calcium iron silicate is crystalline calcium iron silicate.

18. The composition as recited in claim 1, wherein the weight/weight ratio of said spinel crystals to said glass is at least about 1.4/1.

19. The composition as recited in claim 1, wherein the weight/weight ratio of said spinel crystals to said glass is at least about 1.5/1.

20. The composition as recited in claim 1, wherein said composition is comprised of less than about 5 weight percent of ferrometasilicate.

21. The composition as recited in claim 1, wherein said composition is comprised of less than about 1 weight percent of ferrometasilicate.

22. The composition as recited in claim 1, wherein said composition has a Mohs hardness of from about 6 to about 9.

23. The composition as recited in claim 1, wherein said composition has a Mohs hardness of from about 6 to about 8.

24. The composition as recited in claim 1, wherein said composition is prepared by a process in which from about 40 to about 80 weight percent of electric arc furnace dust is mixed with from about 10 to about 40 weight percent of glass in a ratio of from about 2/1 to about 4.5/1 to prepare a mixture, and wherein said mixture is melted at a temperature of less than about 1430 degrees Celsius.

25. The composition as recited in claim 24, wherein said mixture is melted at a temperature of from about 1260 to about 1320 degrees Celsius.

26. The composition as recited in claim 1, wherein said composition is comprised of less than about 10 weight percent of particles smaller than 125 microns.

27. The composition as recited in claim 1, wherein said composition is comprised of at least about 50 weight percent of particles ranging in size from about 45 to about 125 microns.

28. The composition as recited in claim 1, wherein said composition has a density of from about 3.0 to about 4.1 grams per cubic centimeter.

29. The composition as recited in claim 1, wherein said composition is comprised of from about 20 to about 40 weight percent of an iron compound selected from the group consisting of ferrous oxide, ferric oxide, iron-containing spinel, calcium iron silicate, and mixtures thereof.

30. The composition as recited in claim 1, wherein said composition is comprised of less than about 75 weight percent of crystalline material.

* * * * *